United States Patent
Matana et al.

(10) Patent No.: US 12,247,513 B2
(45) Date of Patent: Mar. 11, 2025

(54) COMBUSTION ENGINE FOR A MOTOR VEHICLE, IN PARTICULAR FOR A CAR, AND MOTOR VEHICLE

(71) Applicant: Mercedes-Benz Group AG, Stuttgart (DE)

(72) Inventors: Maroje Matana, Stuttgart (DE); Nils Brinkert, Ludwigsburg (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/255,060

(22) PCT Filed: Nov. 11, 2021

(86) PCT No.: PCT/EP2021/081315
§ 371 (c)(1),
(2) Date: May 30, 2023

(87) PCT Pub. No.: WO2022/117301
PCT Pub. Date: Jun. 9, 2022

(65) Prior Publication Data
US 2023/0417175 A1    Dec. 28, 2023

(30) Foreign Application Priority Data
Dec. 3, 2020    (DE) ............. 10 2020 007 366.2

(51) Int. Cl.
*F02B 37/16*     (2006.01)
*F01N 3/22*      (2006.01)
(Continued)

(52) U.S. Cl.
CPC ............. *F02B 37/168* (2013.01); *F01N 3/22* (2013.01); *F01N 3/30* (2013.01); *F01N 3/32* (2013.01); *F01N 3/34* (2013.01); *F02B 37/00* (2013.01)

(58) Field of Classification Search
CPC .......... F02B 37/00; F02B 37/168; F01N 3/22; F01N 3/30; F01N 3/32; F01N 3/34
See application file for complete search history.

(56) References Cited

U.S. PATENT DOCUMENTS

| | | | |
|---|---|---|---|
| 11,008,982 B2 | 5/2021 | Kratzsch | |
| 2005/0252211 A1* | 11/2005 | Schmid | F02B 37/24 60/605.1 |

FOREIGN PATENT DOCUMENTS

| | | | | |
|---|---|---|---|---|
| DE | 10260779 A1 * | 7/2004 | ............ | F01N 3/023 |
| DE | 10 2010 053 057 A1 | 6/2012 | | |

(Continued)

OTHER PUBLICATIONS

PCT/EP2021/081315, International Search Report dated Feb. 10, 2022 (Two (2) pages).

(Continued)

*Primary Examiner* — Audrey B. Walter
(74) *Attorney, Agent, or Firm* — Crowell & Moring LLP

(57) ABSTRACT

A combustion engine for a motor vehicle includes an exhaust gas tract through which exhaust gas from a combustion chamber of the combustion engine can flow. An exhaust gas turbocharger has a turbine which is arranged in the exhaust gas tract and which has a turbine housing and a turbine wheel at least partially received in the turbine housing and driveable by the exhaust gas. Via a secondary air channel, which opens out into the exhaust gas tract, secondary air flowing through the secondary air channel can be introduced into the exhaust gas flowing through the exhaust gas tract. The secondary air channel opens out inside the turbine housing into the exhaust gas tract.

5 Claims, 2 Drawing Sheets

(51) Int. Cl.
    *F01N 3/30*         (2006.01)
    *F01N 3/32*         (2006.01)
    *F01N 3/34*         (2006.01)
    *F02B 37/00*       (2006.01)

(56) References Cited

FOREIGN PATENT DOCUMENTS

| | | | |
|---|---|---|---|
| DE | 102015006288 A1 * | 12/2015 | ............ F01D 25/06 |
| DE | 10 2016 117 961 A1 | 3/2018 | |
| DE | 10 2017 106 164 A1 | 9/2018 | |
| DE | 10 2019 101 576 A1 | 7/2020 | |
| EP | 1 876 335 A1 | 1/2008 | |

OTHER PUBLICATIONS

German Search Report issued in German application No. 10 2020 007 366.2 dated Jul. 30, 2021, with Statement of Relevancy (Eight (8) pages).
German-language German Office Action issued in German application No. 10 2020 007 366.2 dated Jan. 27, 2023 (Eight (8) pages).
German-language German Office Action issued in German application No. 10 2020 007 366.2 dated May 30, 2023 (Ten (10) pages).

* cited by examiner

COMBUSTION ENGINE FOR A MOTOR VEHICLE, IN PARTICULAR FOR A CAR, AND MOTOR VEHICLE

BACKGROUND AND SUMMARY OF THE INVENTION

The invention relates to a combustion engine for a motor vehicle, in particular for a car. Furthermore, the invention relates to a motor vehicle, in particular a car.

Document DE 10 2016 117 961 A1 discloses an exhaust gas system, operated on a combustion basis, with turbocharger, wherein the exhaust gas flows are fed from cylinders of an internal combustion engine via at least one separate exhaust gas manifold to a twin-scroll turbine, and with a secondary air system for introducing fresh air into the exhaust gas. Furthermore, an apparatus for exhaust gas post-treatment of an internal combustion engine is known from DE 10 2019 101 576 A1. Furthermore, DE 10 2017 106 164 A1 discloses an exhaust gas turbocharger. In addition, a turbine is known from EP 1 876 335 A1. Document DE 10 2010 053 057 A1 discloses a charging device for a combustion engine. Furthermore, an exhaust gas turbocharger for a combustion engine is known from DE 102 60 779 A1. In addition, DE 10 2015 006 288 A1 discloses a turbine for an exhaust gas turbocharger, The object of the present invention is to create a combustion engine for a motor vehicle and also a motor vehicle comprising a combustion engine of this kind, so that a particularly advantageous secondary air guidance can be realized.

A first aspect of the invention relates to a combustion engine, also referred to as an internal combustion engine and designed as a reciprocating piston engine or reciprocating piston machine, for a motor vehicle, in particular for a car preferably designed as a passenger car or otherwise as a commercial vehicle. This means that the motor vehicle, in its fully assembled state, comprises the combustion engine and is driveable by means of the combustion engine. The combustion engine has at least one combustion chamber. In particular, the combustion engine can have a plurality of, and thus at least two or otherwise more than two combustion chambers. In fired operation of the combustion engine, combustion processes are performed in the respective combustion chamber, within the scope of which a respective fuel-air mixture, which is also referred to simply as a mixture, is burned. This results in exhaust gas of the combustion engine. In other words, exhaust gas of the combustion engine is created by the respective burning of the mixture in the respective combustion chamber.

The combustion engine in this case has an exhaust gas tract, through which the exhaust gas from the at least one combustion chamber or from the combustion chambers or all combustion chambers of the combustion engine can flow and which is also referred to as an exhaust gas arrangement or exhaust gas system. At least one exhaust gas post-treatment for post-treatment of the exhaust gas device can be arranged in the exhaust gas tract. The exhaust gas post-treatment device can be designed to remove at least one component of the exhaust gas from the exhaust gas. This can be understood, in particular, to mean that the exhaust gas post-treatment device is designed for example to filter out particles, in particular soot particles, from the exhaust gas. For this purpose, the exhaust gas post-treatment device may comprise a particle filter. Alternatively or additionally, the exhaust gas post-treatment device can be catalytically effective or active for at least one chemical reaction. This is understood in particular to mean that the exhaust gas post-treatment device can be designed to catalytically assist and/or bring about the chemical reaction. During the chemical reaction, for example at least one component of the exhaust gas reacts with at least one further substance and also at least one product of the chemical reaction, so that the at least one component is removed from the exhaust gas as a result of the chemical reaction. For this purpose, the exhaust gas post-treatment device can comprise an oxidation catalyst and/or an SCR catalyst, for example. Furthermore, the combustion engine comprises an intake tract also referred to as an inlet tract, through which at least fresh air can flow. The fresh air flowing through the intake tract can be guided by means of the intake tract to the and into the combustion chamber, in particular to the and into the combustion chambers, of the combustion engine. In addition, a fuel, for example a liquid fuel, can be introduced into the respective combustion chamber, in particular directly injected. The fuel and fresh air form the aforementioned fuel-air mixture.

The combustion engine additionally comprises at least one exhaust gas turbocharger, which comprises a turbine, which is arranged in the exhaust gas tract and through which the exhaust gas thus flows. The turbine has a turbine housing and a turbine wheel, which is arranged at least partially, in particular at least predominantly or completely, in the turbine housing and is rotatable relative to the turbine housing about an impeller rotation axis. The exhaust gas turbocharger comprises at least one compressor, which is arranged in the intake tract and which comprises a compressor wheel arranged in the intake tract. The compressor wheel is preferably arranged at least partially, in particular at least predominantly and thus over more than half and very preferably completely, outside the turbine housing. The compressor wheel is driveable by the turbine wheel in particular via a shaft of the exhaust gas turbocharger, wherein, by driving the compressor wheel, the fresh air flowing through the intake tract can be compressed. The fresh air compressed by means of the compressor wheel is also referred to as charge air, which can be fed to the respective combustion chamber. Here, the respective combustion chamber can be supplied with the charge air.

The combustion engine additionally has at least one secondary air channel, through which secondary air can flow and which opens out into the exhaust gas tract, by means of which secondary air channel the secondary air flowing through the secondary air channel can be introduced into the exhaust gas tract or into the exhaust gas flowing through the exhaust gas tract, in particular bypassing all combustion chambers of the combustion engine. The preferably provided feature that the secondary air flowing through the secondary air channel can be introduced by means of the secondary air channel into the exhaust gas tract or into the exhaust gas flowing through the exhaust gas tract, bypassing all combustion chambers of the combustion engine, is to be understood to mean that the secondary air flowing through the secondary air channel bypasses preferably all combustion chambers of the combustion engine and therefore does not flow through the combustion chambers of the combustion engine. In particular, the secondary air flowing through the secondary air channel is guidable by means of the secondary air channel in such a way, and introducible into the exhaust gas flowing through the exhaust gas tract in such a way, that the secondary air is not involved in a combustion process, and consequently the secondary air is not burned, that is to say is not used for oxidation of a substance, in particular a fuel, at least not until the secondary air has been introduced into the exhaust gas tract or the exhaust gas flowing through the exhaust gas tract, that is to say at least not until the secondary air has exited from the secondary air channel and has passed into the exhaust gas tract or into the exhaust gas flowing through the exhaust gas tract. By means of the secondary air introduced into the exhaust gas flowing through the exhaust gas tract, for example, the aforementioned exhaust gas post-treatment device may be warmed particularly strongly and within a short space of time, in particular as a result of the fact that the secondary air introduced into the exhaust gas flowing through the exhaust gas tract, for example together with fuel fractions which are contained in the exhaust gas and are unburned and thus still burnable, forms a secondary air-fuel fractions mixture, which can be burned in the exhaust gas tract and releases heat. The secondary air introduced into the exhaust gas tract or into the exhaust gas flowing through the exhaust gas tract is thus involved in a combustion of the secondary air-fuel fractions mixture and is thus used to oxidize the fuel fractions. More specifically, oxygen contained in the secondary air introduced into the exhaust gas flowing through the exhaust gas tract is used in order to oxidize the initially only unburned fuel fractions during the combustion of the secondary air-fuel fractions mixture. Here, however, the secondary air is involved in the combustion of the secondary air-fuel fractions mixture, that is to say the secondary air is burned or the secondary air is used for oxidation of the fuel fractions only once the secondary air has been introduced into the exhaust gas tract or into the exhaust gas flowing through the exhaust gas tract, and consequently once the secondary air has exited from the secondary air channel and has passed into the exhaust gas tract or into the exhaust gas flowing through the exhaust gas tract. Again, in other words, the secondary air is involved in the combustion of the secondary air-fuel fractions mixture only in the exhaust gas tract, or the secondary air is used for oxidation of the fuel fractions only in the exhaust gas tract, and therefore the secondary air is involved in the combustion of the secondary air-fuel fractions mixture or is used for oxidation of the fuel fractions only once the secondary air has exited from the secondary air channel and has been introduced into the exhaust gas tract or into the exhaust gas flowing through the exhaust gas tract.

By means of the released heat, for example the exhaust gas post-treatment device may be warmed and thus for example brought to or above its start-up temperature, also referred to as its light-off temperature. The secondary air-fuel fractions mixture is burned for example in that the secondary air-fuel fractions mixture is ignited and thus burned by means of an ignition device, which is arranged in the exhaust gas tract and for example is electrically operable, for example a spark plug, or the secondary air-fuel fractions mixture ignites at a hot component arranged in the exhaust gas tract, in particular the exhaust gas post-treatment device, whereby the secondary air-fuel fractions mixture is burned. The component is, for example, a catalyst, in particular an oxidation catalyst, of the exhaust gas post-treatment device.

The combustion engine comprises a valve element, by means of which the amount of the secondary air flowing through the secondary air channel is adjustable. This can be understood to mean, for example, that a flow cross section through which the secondary air can flow is adjustable by means of the valve element, whereby the amount of secondary air flowing through the secondary air channel is adjustable. In particular, the feature that the amount of secondary air flowing through the secondary air channel is adjustable by means of the valve element can be understood to mean that the valve element is movable or switchable between at least two states. In a first of the states of the valve element, for example, a first value of the amount of secondary air flowing through the secondary air channel is set, wherein the first value may be zero, where applicable apart from any technically induced leaks, so that for example the first state is a closed state, in which the valve element blocks the secondary air channel—where applicable apart from any of the technically induced leaks as mentioned before. No secondary air can then flow through the secondary air channel. In the second state, for example a second value, greater than zero and greater than the first value, of the amount of secondary air flowing through the secondary air channel is set by the valve element, so that in the second state the valve element releases the secondary air channel. The second state is thus for example a released state, in which secondary air can flow through the secondary air channel. Again, expressed in other words, in the second state for example the amount of secondary air flowing through the secondary air channel is greater than in the first state. Furthermore, it is conceivable that the valve element is movable into at least one or more further states, wherein in the further state a value, different from the first value and from the second value and greater than zero, of the amount of secondary air flowing through the secondary air channel, or further value, different from the first value and from the second value and preferably greater than zero, of the amount of secondary air flowing through the secondary air channel is or are set. The introduction of secondary air into the exhaust gas tract or the exhaust gas flowing through the exhaust gas tract is also referred to as secondary air introduction, secondary air feed or secondary air injection.

In order to now be able to realize a particularly advantageous and in particular particularly cost-, weight- and installation space-effective guidance and introduction of the secondary air into the exhaust gas tract or into the exhaust gas flowing through the exhaust gas tract, it is provided in accordance with the invention that the secondary air channel opens out inside the turbine housing into the exhaust gas tract. This is to be understood in particular to mean that the secondary air channel ends inside the turbine housing and thus opens out inside the turbine housing into the exhaust gas tract, so that the secondary air flowing through the secondary air channel can flow out, inside the turbine housing, from the secondary air channel and can flow, consequently can be introduced, into the turbine housing and the exhaust gas flowing through the exhaust gas tract. Again expressed in other words, the secondary air channel ends on the exhaust gas tract side at an exhaust gas tract-side end of the secondary air channel, wherein this is an end of the secondary air channel arranged inside the turbine housing, in particular formed by the turbine housing. A particularly advantageous pressure drop between one end of the secondary air channel and a supply point can be created hereby, at which supply point the secondary air can be supplied to the secondary air channel and consequently can be introduced into the secondary air channel. In particular, it can be ensured that in at least practically any operating state of the combustion engine, a greater pressure prevails at the supply point than at the one end of the secondary air channel, so that the secondary air can be introduced particularly advantageously at the supply point into the secondary air channel, in particular without additional pumps, actuators, valve elements or other, further, separate component parts, can be guided by means of the secondary air channel, in particular on account of the pressure drop, to the one end, and at the one end can be introduced into the exhaust gas tract or the exhaust gas flowing through the exhaust gas tract.

The secondary air channel is fluidically connected or connectable at the supply point to the intake tract via the aforementioned valve element, so that at least some of the fresh air from the intake tract, in particular conveyed and/or compressed by means of the compressor wheel, can be branched off at the supply point, also referred to as a branch point, can be introduced via the valve element into the secondary air channel, and can be introduced as the secondary air by means of the secondary air channel into the exhaust gas tract or the exhaust gas flowing through the exhaust gas tract. In other words, at the supply point (branch point), at least the aforementioned part of the fresh air from the intake tract can be branched off, that is to say can be guided away from the intake tract. The branched-off part of the fresh air from the intake tract is introduced into the secondary air channel, in particular via the valve element. The part of the fresh air introduced into the secondary air channel, or the fresh air introduced into the secondary air channel, in particular via the valve element, can be guided as the secondary air by means of the secondary air channel to the and into the exhaust gas tract, so that the branched part of the fresh air, on its way from the branch point (supply point) to the exhaust gas tract or to the one end, for example flows through the valve element and in so doing preferably bypasses the at least one combustion chamber, in particular all combustion chambers, of the combustion engine, that is to say does not flow through any combustion chamber of the combustion engine. In addition, it is preferably provided that the fresh air branched off from the intake tract, on its way from the supply point to the one end of the secondary air channel, is not involved in a combustion process, so that, from the branch point to the one end of the secondary air channel, the secondary air or the fresh air forming the secondary air is not involved in a combustion process. It is thus preferably provided that fresh air from the intake tract is used as the secondary air.

The supply point (branch point) is arranged downstream of the compressor wheel and, in particular, upstream of the at least one combustion chamber or all combustion chambers of the combustion engine. For example, the branch point is arranged, in the flow direction of the fresh air flowing through the intake tract, upstream of a throttle valve arranged in the intake tract, by means of which throttle valve the amount of the fresh air to be introduced into the at least one combustion chamber or into the combustion chambers and thus to be supplied to the combustion chamber or the combustion chambers is adjustable. If, for example, the first-opened throttle valve is closed, at least the aforementioned part of the fresh air, arranged initially between the compressor wheel and the then closed throttle valve and conveyed or compressed by means of the compressor wheel, can then be branched off at the branch point (supply point) from the intake tract and guided, in particular via the valve element, into the secondary air channel and subsequently into the exhaust gas tract. An excess braking of the compressor wheel caused by the fresh air that is located initially between the compressor wheel and the throttle valve and is compressed, can thus be avoided. The invention can thus combine so to speak a diverter system with a secondary air system. Here, the valve element may assume a dual function, so that the valve element can be formed for example as a combination valve. On the one hand, the valve element can be used to adjust the amount of the secondary air flowing through the secondary air channel and to be introduced into the exhaust gas flowing through the exhaust gas tract, so that the valve element is used as a secondary air valve so to speak. On the other hand, the valve element can be used as a diverter valve (USV), in order to branch off at least the aforementioned part of the fresh air from the intake tract via the diverter valve, to introduce it into the secondary air channel and via this into the exhaust gas flowing through the exhaust gas tract, and thus to use it as the secondary air. For example, an additional, separate diverter system can thus be avoided, and therefore the number of parts, the weight, the installation space requirement and the costs of the combustion engine can be kept particularly low.

Due to the embodiment of the valve element as a combination valve and due to the arrangement of the supply point (branch point), it is also possible to use the compressor wheel and to convey for example the secondary air by means of the compressor wheel, in particular to convey it through the secondary air channel. The compressor wheel can thus be used as a secondary air pump, which is also referred to as an air pump, wherein the secondary air for example is or can be conveyed into the secondary air channel and/or is or can be conveyed through the secondary air channel by means of the secondary air pump. An additional, separate conveying device for conveying secondary air can hereby be avoided, so that the costs, the number of parts, the weight and the installation space requirement of the combustion engine can be kept particularly low. The use of the compressor wheel as secondary air pump is also advantageous insofar as a particularly high pressure drop can be created by means of the compressor wheel or a particularly large mass and/or volume flow of the secondary air can be realized. This means in particular that a particularly large amount of oxygen, also referred to as oxygen quantity, which is contained in the secondary air conveyed by means of the compressor wheel, can be introduced into the exhaust gas tract or into the exhaust gas flowing through the exhaust gas tract, so that for example the exhaust gas post-treatment device can be heated particularly effectively and efficiently.

The secondary air channel, at its exhaust gas tract-side end, has at least one outlet opening, at which the secondary air channel ends and thus opens out into the exhaust gas tract. The secondary air flowing through the secondary air channel can thus be guided out of the secondary air channel via the outlet opening and thus can be introduced into the exhaust gas tract and thus into the exhaust gas flowing through the exhaust gas tract. In addition, the outlet opening is thus arranged at the exhaust gas tract-side end of the secondary air channel.

In order to guide the secondary air in a particularly advantageous way, in particular in a way that is particularly effective in respect of installation space, weight and costs, and in particular to be able to introduce it into the exhaust gas tract, that is to say into the exhaust gas flowing through the exhaust gas tract, it is provided that the secondary air channel opens out into the exhaust gas tract at an introduction point arranged inside the turbine housing, wherein the introduction point is arranged, in the flow direction of the exhaust gas flowing through the turbine housing, downstream of at least a part, in particular at least a predominant part, of the turbine wheel. The at least predominant part of the turbine wheel is understood to mean at least more than half of a length of the turbine wheel running in the axial direction of the turbine wheel. Due to the arrangement of the introduction point downstream of at least part of the turbine wheel, a particularly advantageous pressure drop can be realized between the supply point and the introduction point, wherein for example the aforementioned one end of the secondary air channel is arranged at the introduction point.

In particular, it can be ensured that the pressure at the supply point is sufficiently high and, by contrast, the pressure at the introduction point is sufficiently low, so that a particularly large amount of secondary air can also be introduced into the exhaust gas flowing through the exhaust gas tract, without the need for additional, separate component parts, such as valves, pumps or the like, for this purpose.

The introduction point, at which the exhaust gas tract-side end of the secondary air channel is arranged, is arranged in an outlet region of the turbine, with the exhaust gas being able to flow off from impeller blades of the turbine wheel via the outlet region of the turbine. This is to be understood to mean that, during operation of the turbine, the exhaust gas flows against and around the turbine blades of the turbine wheel and thus drives the turbine wheel, whereupon the exhaust gas flows off from the turbine blades, flows into the outlet region, and flows through the outlet region. The outlet region is thus preferably arranged, in the flow direction of the exhaust gas flowing through the turbine housing, downstream of the impeller blades. Here, it is conceivable in particular that the or all impeller blades are arranged, in particular fully, in the aforementioned part of the turbine wheel. The introduction point does not necessarily have to be arranged downstream of the entire turbine wheel. It is preferably also provided that the introduction point is arranged downstream of at least part of the turbine wheel, in particular downstream of the or all impeller blades of the turbine wheel. It can thus be ensured that a sufficiently low pressure prevails at the introduction point in at least practically all operating states of the combustion engine, the pressure being lower than a further pressure prevailing at the supply point, so that the pressure drop is sufficiently great. The pressure drop is in particular the ratio of the further pressure prevailing at the supply point to the pressure prevailing at the introduction point. The higher the pressure drop, the more easily and more advantageously the secondary air can be introduced into the exhaust gas flowing through the exhaust gas tract, wherein the pressure drop can be made particularly high by the arrangement of the introduction point in the outlet region.

The outlet region is free of impeller blades of the turbine wheel. The pressure drop can thus be made particularly great in a particularly simple way, so that the secondary air can be guided particularly advantageously and in particular particularly easily and can be introduced into the exhaust gas flowing through the exhaust gas tract.

In order to introduce the secondary air, which flows out from the secondary air channel in particular via the outlet opening and flows through the secondary air channel into the exhaust gas flowing through the exhaust gas tract, particularly advantageously into the exhaust gas flowing through the exhaust gas tract and in order to be able to mix the secondary air particularly advantageously with the exhaust gas flowing through the exhaust gas tract, it is provided that a wall extending in the circumferential direction of the turbine wheel, in particular over the circumference thereof, is arranged inside the turbine housing. For example, the wall can be formed in one piece with the turbine housing. The wall can be arranged in such a way, in particular downstream of the turbine wheel, that the wall is arranged completely free of overlap with the turbine wheel inwardly in the radial direction of the turbine wheel, and consequently is not overlapped by the turbine wheel inwardly in the radial direction of the turbine wheel. The wall, however, is preferably arranged in such a way that the wall is overlapped at least in part, in particular at least predominantly or completely, by the turbine wheel inwardly in the radial direction of the turbine wheel, so that the wall extends in the circumferential direction of the turbine wheel over the circumference thereof. Here, it is conceivable that the wall is arranged downstream of at least one or the aforementioned part of the turbine wheel. The wall is distanced inwardly in the radial direction of the turbine wheel from the outlet opening and from wall regions of the turbine housing adjoining the outlet opening in the circumferential direction of the turbine wheel, thus forming a distributor channel, which is delimited outwardly in the radial direction of the turbine wheel by the wall regions and inwardly in the radial direction of the turbine wheel by the wall and extends in the circumferential direction of the turbine wheel, in particular over the circumference thereof. The distributor channel is thus for example a gap, which is arranged in the radial direction of the turbine wheel between the wall regions and the wall and as a result is delimited outwardly in the radial direction of the turbine wheel, and thus the turbine as a whole, by the wall regions and inwardly in the radial direction of the turbine wheel or the turbine by the wall, in particular in each case directly. The axial direction of the turbine wheel is coincident with the impeller rotation axis, wherein the radial direction of the turbine wheel runs perpendicularly to the impeller rotation axis. Here, the circumferential direction of the turbine wheel runs around the impeller rotation axis, that is to say around the axial direction of the turbine wheel. The outlet opening opens out into the distributor channel so that the secondary air flowing through the outlet opening and thus flowing out from the secondary air channel via the outlet opening flows, in particular firstly, into the distributor channel. The secondary air can then flow through the distributor channel, or the secondary air is guided by means of the distributor channel in the circumferential direction of the turbine wheel, in particular over the circumference thereof, and is thus distributed.

The wall, in the circumferential direction of the turbine wheel, has successive through-flow openings, which are spaced apart from one another, for the secondary air, so that the secondary air from the distributor channel can flow through the through-flow openings. The through-flow openings are preferably arranged distributed uniformly in the circumferential direction of the turbine wheel. The through-flow openings open out at one end into the distributor channel and at the other end into a region arranged on the inner side of the wall in the radial direction of the turbine wheel. In other words, the region is arranged on a side of the wall facing away from the distributor channel inwardly in the radial direction of the turbine wheel. This means that the secondary air can flow from the distributor channel into the respective through-flow opening and can flow through the respective through-flow opening. The secondary air flowing through the respective through-flow opening can flow out from the respective through-flow opening and can flow into the region and is thus introduced into the exhaust gas flowing through the region, since the exhaust gas flowing through the turbine housing via the exhaust gas tract can flow through the region. The secondary air can be distributed particularly advantageously, in particular in the circumferential direction of the turbine wheel over the circumference thereof by means of the distributor channel and thus by means of the wall forming or delimiting the distributor channel, so that the secondary air particularly advantageously can be introduced into the exhaust gas and mixed with the exhaust gas. The distributor channel and the wall thus form a distributor device or are part of a distributor device, wherein the distributor device is also referred to as a distributor or secondary air distributor. The secondary air from the secondary air channel can be distributed particularly advantageously by means of the secondary air distributor and introduced into the exhaust gas and in particular mixed with the exhaust gas, so that the exhaust gas post-treatment device can be heated or warmed within a short space of time and thus effectively and efficiently.

Here, it has been found to be particularly advantageous if the outlet opening is overlapped at least in part, in particular at least predominantly, and thus over more than half or completely, by the turbine wheel inwardly in the radial direction of the turbine wheel. A particularly advantageous pressure drop can hereby be ensured, in particular from the supply point to the outlet opening, so that the secondary air can be introduced in almost practically all operating regions or operating points of the combustion engine particularly advantageously into the exhaust gas flowing through the exhaust gas tract.

The aforementioned, one end of the secondary air channel is a so-called exhaust gas tract-side end of the secondary air channel, since the secondary air channel ends in the exhaust gas tract or opens out into the exhaust gas tract via the one, exhaust gas tract-side end. Here, the outlet opening is arranged for example at the one, exhaust gas tract-side end.

It has been shown here to be particularly advantageous if a length region of the secondary air channel comprising the one exhaust gas tract-side end and ending at its one, exhaust gas tract-side end and opening out at the exhaust gas tract-side end into the exhaust gas tract is arranged or runs inside the turbine housing. This means that the secondary air channel ends over the length region and thus at the exhaust gas tract-side end, so that the length region ends at the exhaust gas tract-side end and is thus an end region of the secondary air channel. Here, the length region is delimited along its circumferential direction completely circumferentially directly by the turbine housing. The number of parts and thus the costs, the weight and installation space requirement for guiding and introducing the secondary air into the exhaust gas flowing through the exhaust gas tract can thus be kept particularly low.

The turbine housing is preferably formed in one piece. In other words, the turbine housing is a one-piece housing element, in which the turbine wheel is arranged at least in part, in particular at least predominantly or completely. Again expressed in other words, the turbine housing has a one-piece main body, which for example delimits at least the length region of the secondary air channel in the circumferential direction of the length region completely circumferentially. Alternatively or additionally, the main body or the housing element forms the aforementioned wall and also preferably the wall regions.

Lastly, it has been shown to be particularly advantageous if the turbine housing, in particular the main body or the housing element, delimits a receiving region, in particular directly, wherein the turbine wheel, in particular in relation to its length running in the axial direction of the turbine wheel, is arranged at least in part, in particular at least predominantly and thus over more than half or completely, in the receiving region and thus in the preferably one-piece turbine housing, main body or housing element. The number of parts and thus the costs, the installation space requirement and the costs for guiding and introducing the secondary air, and consequently to realize the secondary air injection, can thus be kept particularly low.

The exhaust gas tract-side end or the outlet opening of the secondary air channel is also referred to as a mouth or secondary air mouth, since the secondary air channel opens out at its exhaust gas tract-side end or via the outlet opening into the exhaust gas tract. Since the exhaust gas tract-side end or the outlet opening is now arranged inside the turbine housing, an integration of secondary air mouth into the turbine housing is provided in accordance with the invention. In particular, an integration of the aforementioned distributor into the turbine housing is provided in accordance with the invention, wherein it is preferably provided that the secondary air distributor, in the flow direction of the exhaust gas flowing through the turbine housing, is arranged downstream of at least part of the turbine wheel. In particular, the secondary air distributor or the wall is arranged in the outlet region. The secondary air mouth or the distributor is for example arranged directly after the turbine wheel, in order to arrange the outlet opening or the distributor at a point, and consequently to allow the secondary air channel to open out into the exhaust gas tract at a point, which for example is the aforementioned introduction point, wherein the lowest pressure possible prevails at the point. In particular, it can be ensured that an advantageously low pressure, in particular a negative pressure, prevails at the exhaust gas tract-side end or at the introduction point, in particular at all times, so that for example a gas, for example the exhaust gas, can be prevented from flowing into the secondary air channel and flowing via the secondary air channel into the intake tract, without the need to arrange an additional, separate check valve in the secondary air channel for this purpose. The number of parts and thus the costs, the installation space requirement and the weight can thus be kept particularly low.

The invention can thus realize in particular the following advantages:

ensuring a particularly advantageous pressure drop between the supply point and the introduction point providing an advantageous position for a secondary combustion, within the scope of which for example the aforementioned secondary air-fuel fractions mixture is burned, wherein the position can preferably be upstream or directly before a catalyst, in particular the exhaust gas post-treatment device the secondary air injection can be provided particularly easily and cost-effectively.

A second aspect of the invention relates to a motor vehicle formed preferably as a car, in particular as a passenger car, which has a combustion engine according to the first aspect of the invention. Advantages and advantageous embodiments of the first aspect of the invention are to be considered as advantages and advantageous embodiments of the second aspect of the invention, and vice versa.

Further advantages, features and details of the invention will become clear from the following description of a preferred exemplary embodiment and with reference to the drawings. The features and combinations of features described above in the description as well as the features and combinations of features presented hereinafter in the figure description and/or shown alone in the figures are usable not only in the combination specified in each instance, but also in other combinations or in isolation, without departing from the scope of the invention.

DETAILED DESCRIPTION OF THE DRAWINGS

In the figures, like functionally like elements are provided with like reference signs.

Figure 1:
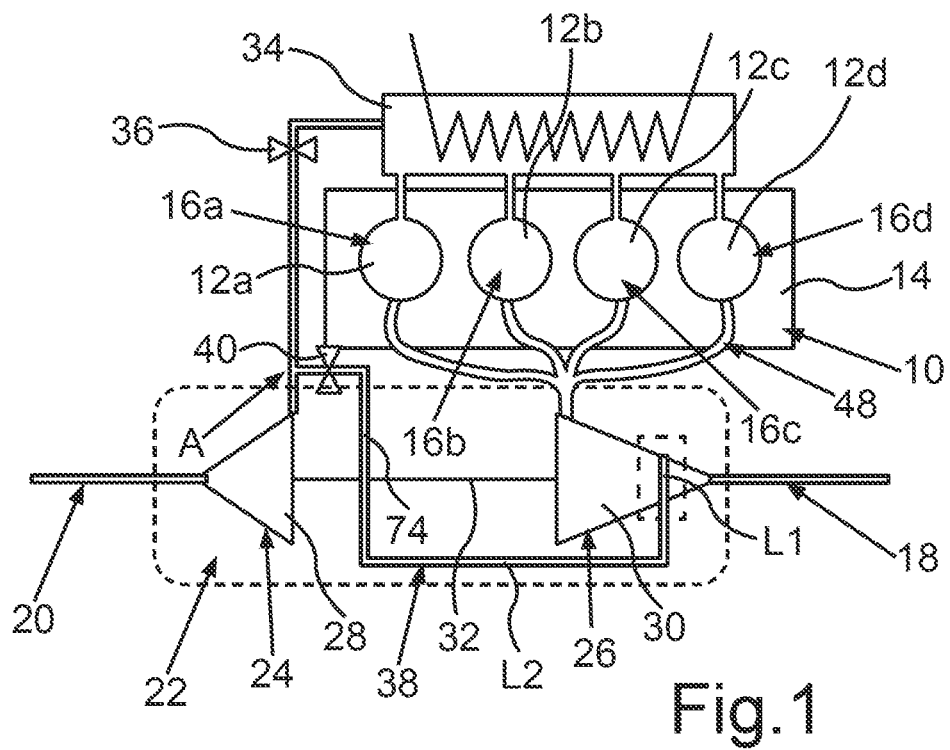
FIG. 1 shows a schematic depiction of an internal combustion engine according to the invention for a motor vehicle.

FIG. 1 shows a schematic depiction of a combustion engine 10, formed as a reciprocating piston machine or reciprocating piston engine, for a motor vehicle formed preferably as a car, in particular as a passenger car. This means that the motor vehicle, in its fully assembled state, comprises the combustion engine 10 and is driveable by means of the combustion engine 10. The combustion engine 10 has, in the present case, exactly four cylinders 12a-d, which in particular are arranged one after the other or in succession along a notional straight line and thus in series, and of which are formed or delimited by a cylinder housing 14 of the combustion engine 10 formed for example as a cylinder crankcase. Each cylinder 12a-d delimits a respective combustion chamber 16a-d, so that the combustion engine 10 in the exemplary embodiment shown in FIG. 1 has exactly four combustion chambers 16a-d. During fired operation of the combustion engine 10, combustion processes are performed in the combustion chambers 16a-d. A respective piston is arranged movably in translation in each of the cylinders 12a-d, wherein the respective piston partially delimits the respective combustion chamber 16a-d.

The combustion engine 10 has an exhaust gas tract 18, through which exhaust gas from the combustion chambers 16a-d can flow and in which, for example, an exhaust gas post-treatment device, not shown in the figures, for post-treatment of the exhaust gas can be arranged. During fired operation, a fuel-air mixture, which comprises a preferably liquid fuel and fresh air, is burned in the respective combustion process occurring in the respective combustion chamber 16a-d. The exhaust gas is created by the combustion of the fuel-air mixture. The combustion engine 10 in this case has an intake tract 20, through which the fresh air can flow and which is also referred to as an inlet tract, by means of which the fresh air flowing through the intake tract 20 is guided to the and into the combustion chambers 16a-d and thus to the and into the cylinders 12a-d.

The combustion engine 10 additionally comprises an exhaust gas turbocharger 22, which has a compressor 24 arranged in the intake tract 20 and a turbine 26 arranged in the exhaust gas tract 18. The compressor 24 comprises a compressor wheel 28, which is arranged in the intake tract 20 and by means of which the fresh air flowing through the intake tract 20 can be compressed. The turbine 26 comprises a turbine wheel 30 arranged in the exhaust gas tract 18 and driveable by the exhaust gas. Exhaust gas turbocharger 22 additionally comprises a shaft 32, via which the compressor wheel 28 is driveable by the turbine wheel 30. By driving the compressor wheel 28, the fresh air flowing through the intake tract 20 is compressed by means of the compressor wheel 28.

In the flow direction of the fresh air flowing through the intake tract 20, a charge air cooler 34 is arranged downstream of the compressor wheel 28 and is used to cool the compressed and thus warmed fresh air, before it flows into the combustion chambers 16a-d. Furthermore, in the flow direction of the fresh air flowing through the intake tract 20, a throttle valve 36 is arranged in the intake tract 20 downstream of the compressor wheel 28 and upstream of the charge air cooler 34. By means of the throttle valve 36, the amount of fresh air to be supplied to the combustion chambers 16a-d can be adjusted.

The combustion engine 10 additionally comprises a secondary air channel 38, through which secondary air can flow and by means of which the secondary air flowing through the secondary air channel 38 can be introduced into the exhaust gas flowing through the exhaust gas tract 18. The secondary air introduced into the exhaust gas tract 18 or into the exhaust gas flowing through the exhaust gas tract 18 can form a secondary air-fuel fractions mixture, for example together with unburned and thus still burnable components of the aforementioned fuel, wherein the components of the fuel are also referred to as fuel fractions. The secondary air-fuel fractions mixture can be burned in the exhaust gas tract 18, thus releasing heat. For example, the aforementioned exhaust gas post-treatment device can hereby be heated, that is to say warmed, particularly effectively and efficiently. The aforementioned constituents of the fuel received in the exhaust gas tract 18 or in the exhaust gas flowing through the exhaust gas tract 18 are fuel fractions that are passed unburned from at least one of the combustion chambers 16a-d into the exhaust gas tract 18 and/or are introduced, in particular injected, in a targeted manner into the exhaust gas tract 18, in particular bypassing all combustion chambers 16a-d and/or via at least one of the combustion chambers 16a-d.

Furthermore, the combustion engine 10 comprises a valve element 40, by means of which the amount of the secondary air flowing through the secondary air channel 38 is adjustable. For example, the valve element 40 can be switched or moved between at least one closed position and at least one released position. In the closed position, the valve element 40 blocks the secondary air channel 38, so that no secondary air can flow through the secondary air channel 38. In the released position, the valve element 40 for example releases the secondary air channel 38, so that in the released position secondary air can flow through the secondary air channel 38 and can be introduced into the exhaust gas tract 18 by means of the secondary air channel 38. The introduction of the secondary air into the exhaust gas tract 18, that is to say into the exhaust gas flowing through the exhaust gas tract, is also referred to as secondary air injection, secondary air feed or secondary air introduction.

In order to be able to realize a particularly advantageous secondary air injection, the valve element 40 is formed as a combination valve, which is also referred to as a combi valve. The secondary air channel 38 is fluidically connected or connectable via the valve element 40 the intake tract 20 at a branch position A downstream of the compressor wheel 28 and upstream of the throttle valve 36. This means that, at the branch point A, at least part of the fresh air from the intake tract 20 can be branched off, and consequently discharged or guided away. The fresh air branched off from the intake tract 20 at the branch point A or the aforementioned part of the fresh air can be introduced by the valve element 40 into the secondary air channel 38 and introduced as the aforementioned secondary air by means of the secondary air channel 38 into the exhaust gas tract 18 or into the exhaust gas flowing through the exhaust gas tract 18. This means that the aforementioned part of the fresh air branched off at the branch point A from the intake tract 20 is the aforementioned secondary air or is used as a secondary air flowing through the secondary air channel 38. Since the branch point A is arranged downstream of the compressor wheel 28, the compressor wheel 28 or the compressor 24 can be used as a secondary air pump in order to convey the secondary air, in particular to convey it into the secondary air channel 38 and/or to convey it through the secondary air channel 38 and/or to convey it into the exhaust gas tract 18 or into the exhaust gas flowing through the exhaust gas tract 18. An additional, separate secondary air pump can thus be avoided, so that the number of parts, the weight, the costs and the installation space requirement of the combustion engine 10 can be kept particularly low. It can be seen that the secondary air flowing through the secondary air channel 38 originates from the intake tract 20 and is introduced into the exhaust gas flowing through the exhaust gas tract 18, bypassing the or all combustion chambers 16a-d, wherein the secondary air, at least on its way from the branch point A into the exhaust gas tract 18 or into the exhaust gas flowing through the exhaust gas tract 18, is not involved in any combustion process, consequently is not burned or is not used for a combustion process. In addition, the secondary air, on its way from the branch point A into the exhaust gas tract 18, does not flow through any combustion chamber of the combustion engine 10.

The secondary air channel 38 and the valve element 40 can assume a dual function. On the one hand, the secondary air channel 38 is used to introduce, that is to say to inject, a secondary air into the exhaust gas tract 18 or into the exhaust gas flowing through the exhaust gas tract 18. In this regard, the valve element 40 is used on the one hand as a secondary air valve in order to adjust the amount of secondary air flowing through the secondary air channel 38 and to be introduced into the exhaust gas flowing through the exhaust gas tract 18. On the other hand, the secondary air channel 38 so to speak is used to realize a type of diverter valve or diverter system, wherein in this regard the valve element 40 can be used as a diverter valve or as a type of diverter valve. Since the branch point A is arranged downstream of the compressor wheel 28 and upstream of the throttle valve 36, for example when the initially open throttle valve 36 is closed, in particular abruptly, an excess breaking of the compressor wheel 28, caused by the fresh air initially arranged between the compressor wheel 28 and the throttle valve 36 and compressed by means of the compressor wheel 28, can be avoided in such a way that at least some of the fresh air initially arranged between the compressor wheel 28 and the throttle valve 36 is branched off from the intake tract 20 at the branch point A and is introduced via the valve element 40 into the secondary air channel 38.

Figure 2:
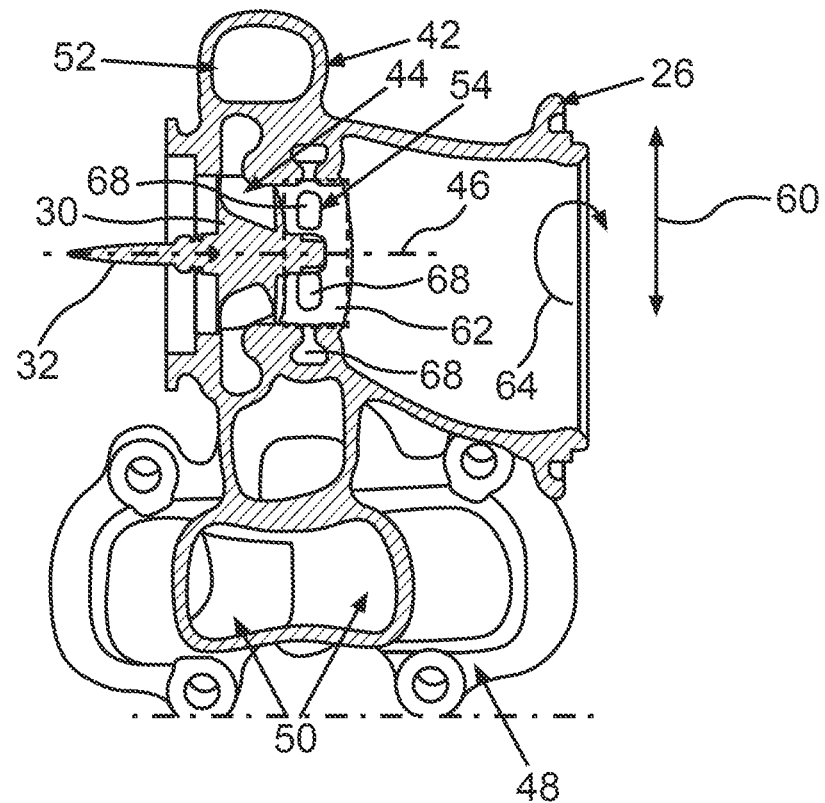
FIG. 2 shows a schematic longitudinal sectional view of a turbine housing of an exhaust gas turbocharger of the combustion engine.
Figure 3:
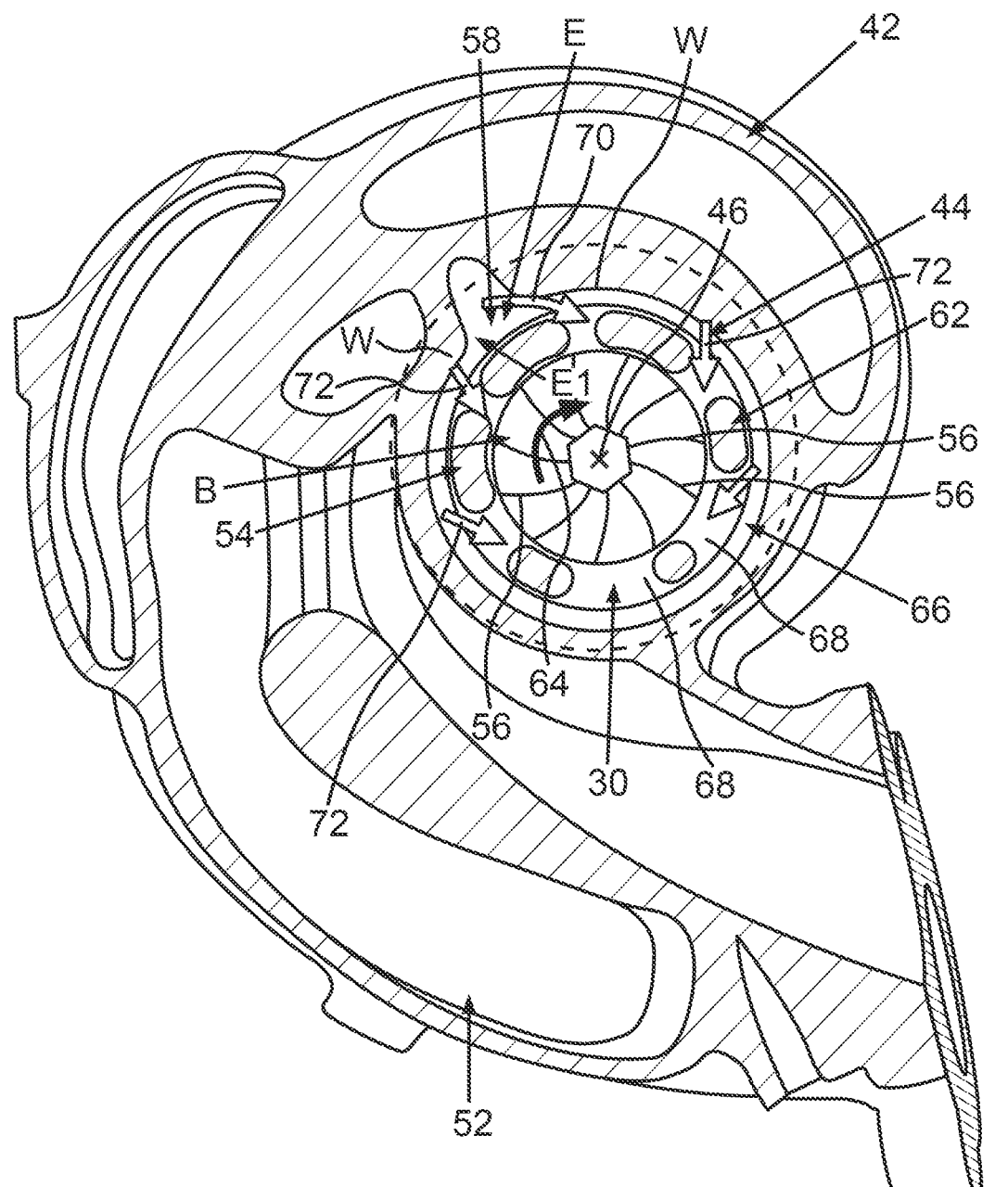
FIG. 3 shows a schematic cross-sectional view of the turbine housing formed preferably in one piece.

Under consideration of FIGS. 2 and 3 in combination, it can be seen that the turbine 26 has a preferably one-piece turbine housing 42, that is to say formed in one piece, in which the turbine wheel 30 is arranged, in particular in respect of its length running in the axial direction of the turbine wheel 30, at least in part, in particular at least predominantly or completely. Here, the turbine housing 42 forms or delimits a receiving region 44 also referred to as a receiving space, in particular directly, wherein the turbine wheel 30, in particular in respect of its length running in the axial direction of the turbine wheel 30, is arranged at least in part, in particular at least predominantly or completely, in the receiving region 44. The turbine wheel 30 is rotatable about a rotation axis 46, which is also referred to as an impeller rotation axis, relative to the turbine housing 42. Here, the axial direction of the turbine wheel 30 coincides with the rotation axis 46. In the exemplary embodiment shown in the figures, the turbine housing 42 is formed in one piece. This means that the turbine housing 42 is a one-piece housing element or a one-piece main body.

Furthermore, the combustion engine 10 has an exhaust gas manifold 48 referred to simply as a manifold, in or by means of which the exhaust gas from the various combustion chambers 16a-d is combined, in particular in a channel common to the combustion chambers 16a-d. Here, the turbine housing 42 is integrated in the exhaust gas manifold 48, or vice versa. In the present case, this is to be understood to mean that the exhaust gas manifold 48 is formed in one piece with the turbine housing 42. Here, the exhaust gas manifold 48 has at least one exhaust gas channel 50 per combustion chamber 16a-d, wherein the exhaust gas channels are separated from one another in respective partial regions. The exhaust gas from the combustion chambers 16a-d can flow through the exhaust gas channels 50 and is combined by means of the exhaust gas channels 50 and in particular guided to the turbine housing 42. The turbine housing 42 forms or delimits at least or exactly one channel 52, through which the exhaust gas from the or all combustion chambers 16a-d can flow and which is preferably formed as a spiral channel. This means that the channel 52 extends in a spiral shape in the circumferential direction of the turbine wheel 30 over the circumference thereof. The exhaust gas from the combustion chambers 16a-d can flow through the channel 52 and is guided by means of the channel 52 to the and in particular into the receiving region 44 and thus to the turbine wheel in particular in such a way that the channel 52 opens out into the receiving region 44. In this case, the one-piece turbine housing 42 forms or delimits the channel 52, in particular directly.

In order to now be able to realize the secondary air injection in a particularly simple and in particular particularly cost-, weight- and installation space-favourable way, the secondary air channel 38 opens out inside the turbine housing 42 into the exhaust gas tract 18. Here, the secondary air channel 38 opens out at an introduction point E (FIG. 3) inside the turbine housing 42 into the exhaust gas tract 18, wherein the introduction point E is arranged, in the flow direction of the exhaust gas flowing through the turbine housing 42, downstream of at least part of the turbine wheel 30. It can be seen particularly clearly from FIGS. 2 and 3 that the introduction point E is arranged in an outlet region 54 of the turbine 26, with the exhaust gas being able to flow off from impeller blades 56 of the turbine wheel 30 via the outlet region of the turbine. Here, the outlet region 54 is free of impeller blades of the turbine wheel 30.

The secondary air channel 38 has at least or exactly one outlet opening 58, which is arranged at an exhaust gas tract-side end E1 of the secondary air channel 38. The secondary air channel 38 ends at the end E1 and thus at the outlet opening 58, whereby the secondary air channel 38 opens out into the exhaust gas tract 18 at the or via the outlet opening 58 and thus at the end E1. The end E1 is thus arranged at the introduction point E. Here, the secondary air flowing through the secondary air channel 38 can be guided out from the secondary air channel 38 via the outlet opening 58 and thus at the end E1 and thus can be introduced into the exhaust gas tract 18 and into the exhaust gas flowing through the exhaust gas tract 18. Here, the outlet opening 58 is overlapped at least in part, in particular at least predominantly or completely, by the turbine wheel 30 inwardly in the radial direction of the turbine wheel 30, in particular is overlapped by such a partial region of the turbine wheel 30, the partial region being free from impeller blades of the turbine wheel 30. The radial direction of the turbine wheel is illustrated in FIG. 2 by a double-headed arrow 60 and runs perpendicularly to the axial direction of the turbine wheel 30.

It can be seen particularly clearly from FIGS. 2 and 3 that a wall 62 extending in the circumferential direction of the turbine wheel 30 over the circumference thereof is arranged inside the turbine housing 42. The circumferential direction of the turbine wheel runs around the rotation axis 46 and is illustrated in FIGS. 2 and 3 by an arrow 64. In the exemplary embodiment shown in the figures, the wall 62 is formed in one piece with the turbine housing 42, that is to say is formed by the turbine housing 42 formed in one piece, in particular by the one-piece main body or by the one-piece housing element. The wall 62 is distanced inwardly in the radial direction of the turbine wheel 30 from the outlet opening 58 and from wall regions W of the turbine housing 52 adjoining the outlet opening 58 in the circumferential direction of the turbine wheel 30, thus forming a distributor channel 66, which is delimited outwardly in the radial direction of the turbine wheel 30 by the wall regions W and inwardly in the radial direction of the turbine wheel 30 by the wall 62 and which extends in the circumferential direction of the turbine wheel 30 over the circumference thereof and is thus arranged in the radial direction of the turbine wheel 30 between the wall 62 and the wall regions W and extends in the circumferential direction of the turbine wheel 30 around the circumference thereof, in particular completely circumferentially. Here, the outlet opening 58 opens out into the distributor channel 66, so that the secondary air channel 38 opens out via its outlet opening 58 into the distributor channel 66.

The wall 62, in the circumferential direction of the turbine wheel 30, has successive through-flow openings 68, which are spaced apart from one another in a uniformly distributed manner, and which each open out at one end into the distributor channel 66 and at the other end into a region B, which is arranged in particular in the outlet region 54, is arranged in the radial direction of the turbine wheel 30 on the inner side of the wall 62 and which can be passed through by the exhaust gas flowing through the turbine housing 42. The secondary air flowing through the secondary air channel 38 can thus flow out from the secondary air channel 38 via the outlet opening 58 and subsequently or thereupon can flow directly into the distributor channel 66, as is illustrated in FIG. 3 by an arrow 70. The secondary air that has passed into the distributor channel 66 can flow through the distributor channel 66 and is thus guided and distributed by means of the distributor channel 66 in the circumferential direction of the turbine wheel 30 around the circumference thereof. The secondary air from the distributor channel 66 can flow through the through-flow opening 68 and thus can flow via the through-flow openings 68 from the distributor channel 66 into the region B and thus into the exhaust gas flowing through the region B. The secondary air from the secondary air channel 38 is thus particularly advantageously distributed and introduced into the exhaust gas, in particular mixed with the exhaust gas. The wall 62 and the distributor channel 66 thus form for example a secondary air distributor, by means of which the secondary air from the secondary air channel 38 particularly advantageously can be distributed in the circumferential direction of the turbine wheel 30 over the circumference thereof and introduced into the exhaust gas.

It can be seen particularly clearly from FIGS. 1 to 3 that a first length region L1 of the secondary air channel 38 comprising the exhaust gas tract-side end E1 of the secondary air channel 38 is arranged inside the turbine housing 42 and is delimited or formed along its circumferential direction completely circumferentially directly by the turbine housing 42, that is to say by the one-piece housing element or by the one-piece main body. At least a second length region L2 (FIG. 1) of the secondary air channel 38 is formed or delimited for example by a secondary air line 74. The secondary air line 74 is for example formed separately from the turbine housing 42 and is connected at least fluidically and preferably also mechanically to the turbine housing 42, in particular in such a way that the second length region L2, through which the secondary air can flow, is fluidically connected to the length region L1. Whereas the length region L1 runs inside the turbine housing 42, the length region L2 runs outside the turbine housing 42, in particular completely. The secondary air can thus flow out from the length region L2 and can flow into the length region L1. Here, the length region L2 is arranged upstream of the length region L1 in the flow direction of the secondary air flowing through the secondary air channel 38.

The secondary air distributor and in particular the end E1 and thus the outlet opening 58 are arranged downstream of at least part of the turbine wheel 30, since an advantageously low pressure, in particular negative pressure, then prevails at least at practically any operating point or operating state of the combustion engine 10 at the introduction point E and thus at the end E1 of the secondary air channel 38, at the end E1 of which the outlet opening 58 is arranged, so that a particularly advantageous and in particular advantageously large pressure drop can be ensured from the branch point A to the introduction point E or towards the end E1. A sufficiently large amount of the secondary air can thus be guided from the branch point A to the introduction point E, without an excessively large number of separate, additional component parts, such as actuators, pumps and/or valves being necessary for this purpose. In addition, exhaust gas can easily be prevented from flowing back undesirably from the introduction point E to the removal point A. In particular, check valves in the secondary air channel 38 can thus be avoided.

The invention claimed is:

1. A combustion engine (10) for a motor vehicle, comprising:
    an exhaust gas tract (18) through which exhaust gas from a combustion chamber (16*a*-*d*) of the combustion engine (10) can flow;
    an intake tract (20) through which fresh air can flow and via which fresh air flowing through the intake tract (20) is guided to, and into, the combustion chamber (16*a*-*d*);
    an exhaust gas turbocharger (22), wherein the exhaust gas turbocharger (22) comprises a compressor (24) which is disposed in the intake tract (20) and which has a compressor wheel (28) for compressing the fresh air, and comprises a turbine (26) which is disposed in the exhaust gas tract (18) and which has a turbine housing (42) and a turbine wheel (30) at least partially received in the turbine housing (42) and driveable by the exhaust gas, wherein via the turbine wheel (30) the compressor wheel (28) is driveable;
    a secondary air channel (38) through which secondary air can flow and which opens out into the exhaust gas tract (18), wherein via the secondary air channel (38) secondary air flowing through the secondary air channel (38) can be introduced into exhaust gas flowing through the exhaust gas tract (18), wherein the secondary air channel (38) opens out inside the turbine housing (42) into the exhaust gas tract (18), wherein the secondary air channel (38) has an outlet opening (58) at which the secondary air channel (38) ends and thus opens out into the exhaust gas tract (18), wherein the secondary air flowing through the secondary air channel (38) can be guided out from the secondary air channel (38) via the outlet opening (58) which is disposed at an exhaust gas tract-side end (E1) of the secondary air channel (38)

ending at the exhaust gas tract-side end (E1) and thus opening out into the exhaust gas tract (18) and thus can be introduced into the exhaust gas tract (18) and into the exhaust gas flowing through the exhaust gas tract (18);

wherein a wall (62) extending in a circumferential direction (64) of the turbine wheel (30) is disposed inside the turbine housing (42) and is distanced inwardly in a radial direction (60) of the turbine wheel (30) from the outlet opening (58) and from wall regions (W) of the turbine housing (42) adjoining the outlet opening (58) in the circumferential direction (64) of the turbine wheel (30), thus forming a distributor channel (66), which is delimited outwardly in the radial direction (60) of the turbine wheel (30) by the wall regions (W) and inwardly in the radial direction (60) of the turbine wheel (30) by the wall (62) and extends in the circumferential direction (64) of the turbine wheel (30), into which distributor channel the outlet opening (58) opens;

wherein the wall (62), in the circumferential direction (64) of the turbine wheel (30), has successive through-flow openings (68) which are spaced apart from one another and which at one end open out into the distributor channel (66) and at the other end open out into a region (B) which is disposed on an inner side of the wall (62) in the radial direction (60) and which can be passed through by the exhaust gas flowing through the turbine housing (42);

wherein the region (B) is disposed in an outlet region (54) of the turbine (26), with the exhaust gas being able to flow off from impeller blades (56) of the turbine wheel (30) via the outlet region (54) of the turbine;

wherein the outlet region (54) is free of impeller blades (56) of the turbine wheel (30);

wherein the secondary air channel (38) opens out into the exhaust gas tract (18) at an introduction point (E) disposed downstream of at least part of the turbine wheel (30) in a flow direction of the exhaust gas flowing through the turbine housing (42);

wherein the introduction point (E), at which the exhaust gas tract-side end (E1) of the secondary air channel (38) is disposed, is disposed in the outlet region (54) of the turbine (26); and a valve element (40) via which an amount of the secondary air flowing through the secondary air channel (38) is adjustable;

wherein the secondary air channel (38) is fluidically connected or connectable to the intake tract (20) via the valve element (40) at a branch point (A) disposed downstream of the compressor wheel (28), whereby, at the branch point (A), at least a part of the fresh air from the intake tract (20) can be branched off and can be introduced via the valve element (40) into the secondary air channel (38) and can be introduced as the secondary air by the secondary air channel (38) into the exhaust gas flowing through the exhaust gas tract (18).

2. The combustion engine (10) according to claim 1, wherein the outlet opening (58) is overlapped inwardly in the radial direction (60) of the turbine wheel (30) at least in part by the turbine wheel (30).

3. The combustion engine (10) according to claim 1, wherein a length region (L1) of the secondary air channel (38) comprising the exhaust gas tract-side end (E1) of the secondary air channel (38) and ending at its exhaust gas tract-side end (E1) and thus opening out into the exhaust gas tract (18) is disposed inside the turbine housing (42) and wherein the length region (L1) is delimited along its circumferential direction completely circumferentially directly by the turbine housing (42).

4. The combustion engine (10) according to claim 1, wherein the turbine housing (42) delimits a receiving region (44) and wherein the turbine wheel (30) is disposed at least in part in the receiving region (44).

5. A motor vehicle, comprising:
the combustion engine (10) according to claim 1.

* * * * *